Dec. 10, 1935.  H. W. BARTLETT  2,023,660
NUT HANDLING MACHINE
Filed May 7, 1934     3 Sheets-Sheet 1
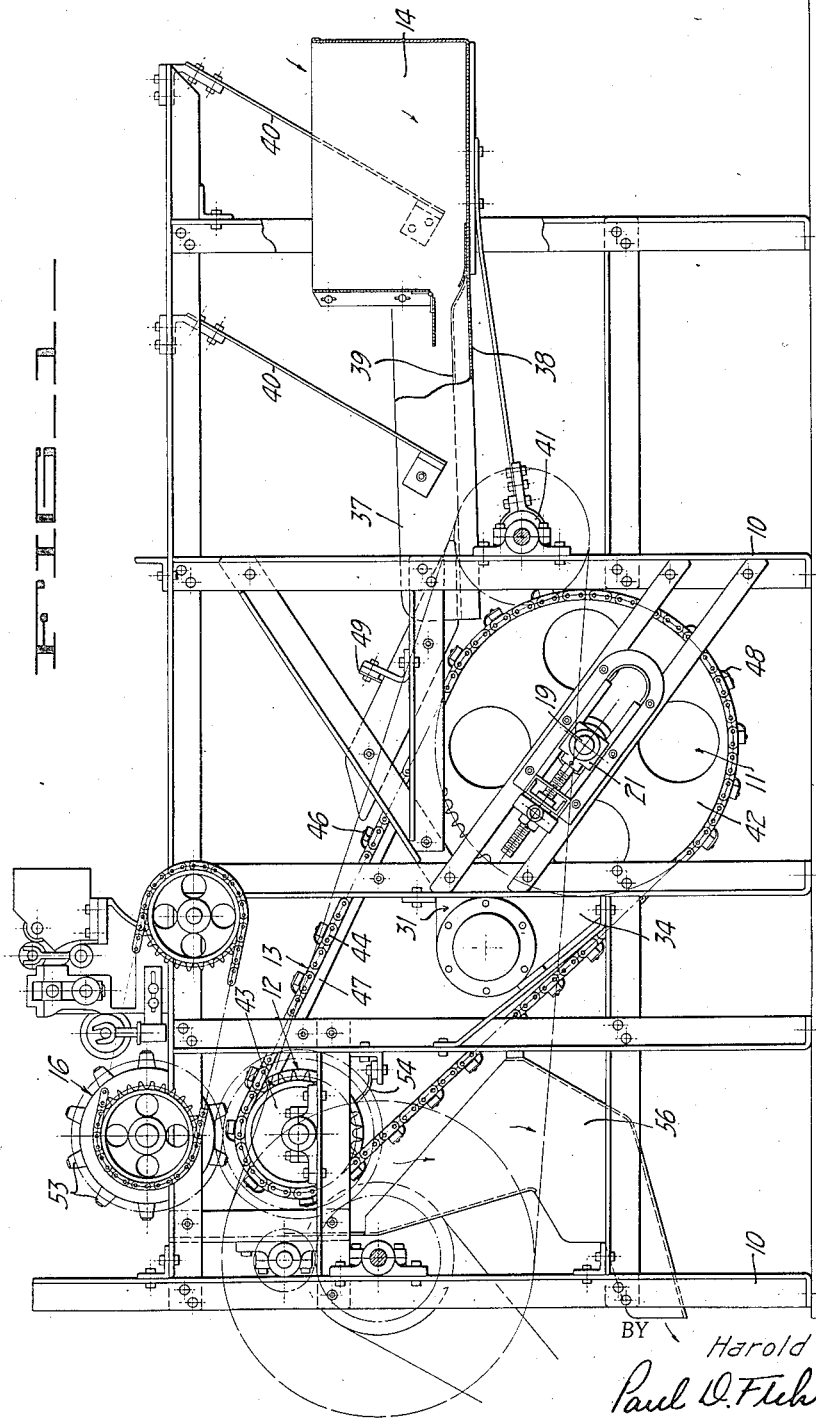
INVENTOR.
Harold W. Bartlett
BY
Paul O. Fiehr ATTORNEY.

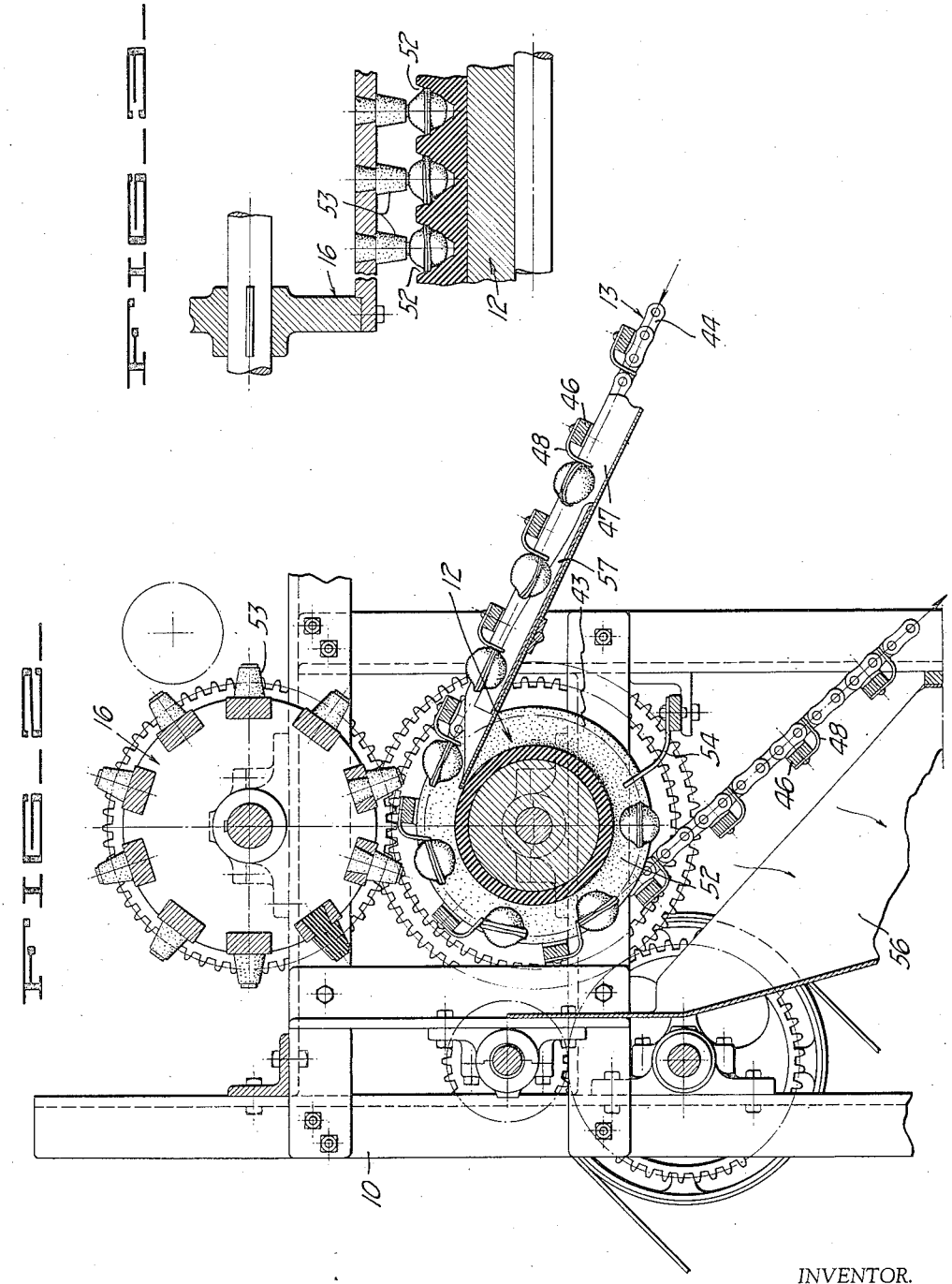

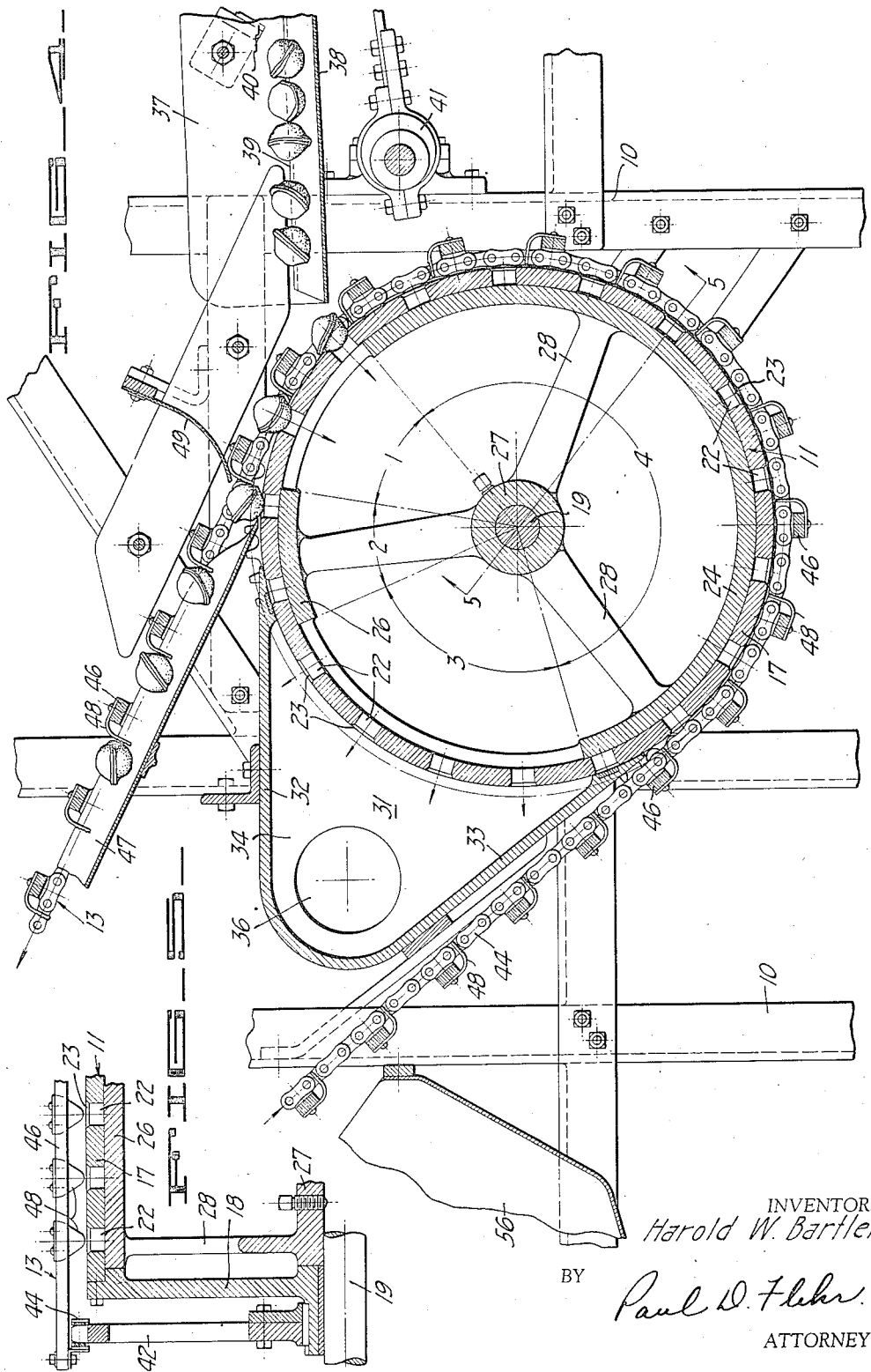

Patented Dec. 10, 1935

2,023,660

UNITED STATES PATENT OFFICE 2,023,660

NUT HANDLING MACHINE

Harold W. Bartlett, San Jose, Calif., assignor to Rosenberg Bros. & Co., San Francisco, Calif., a corporation of California Application May 7, 1934, Serial No. 724,300

5 Claims. (Cl. 198—25)

This invention relates generally to machines for the handling of walnuts or the like, particularly where it is desired to place brands or trademarks upon the articles preparatory to marketing the same.

It is a general object of the invention to provide improved means for supplying or feeding nuts in a predetermined manner to mechanism for marking or branding the same. The improved mechanism disclosed herein is characterized by the fact that it permits relatively high speed operation, with resulting high capacity for a machine of a given size.

Further objects of the invention will appear from the following description in which the preferred embodiment of the invention has been set forth in detail in conjunction with the accompanying drawings.

Referring to the drawings:

Fig. 1 is a side elevational view, partly in cross section, illustrating a complete nut marking machine in accordance with the present invention.

Fig. 2 is a side elevational detail, in cross section, illustrating the mechanism which I prefer to employ for marking the nuts, and which has been disclosed and claimed in co-pending application Serial Number 704,863, which matured into Patent No. 1,992,347, February 26, 1935.

Fig. 3 is a cross sectional detail, illustrating the manner in which the nuts are retained during a printing operation.

Fig. 4 is a side elevational view, in cross section, illustrating my improved mechanism for receiving the nuts and for distributing and presenting the nuts to the printing means.

Fig. 5 is a cross sectional detail of a portion of the rotatable drum shown in Fig. 4, together with a part of the conveying means and valve means associated therewith.

Referring first to Fig. 1, the machine as illustrated consists of a frame 10 which may be formed of suitable structural elements. Carried by the frame 10 there is a rotatable drum 11 and a roll 12, both of which are engaged by the endless conveyor 13. The nuts as they are supplied to the machine are introduced into the hopper 14 and, after being distributed in a manner which will be presently explained, they are presented to roll 12 by the conveyor 13, where they are engaged by stamping or printing elements carried by roll 16.

The preferred construction for drum 11 and its associated parts can be best explained by reference to Fig. 4. It consists of cylindrically shaped side walls 17, carried by the circular end walls 18 (Fig. 5). The end walls are journaled upon a fixed horizontal shaft 19, the ends of which are supported upon the main frame 10 by suitable adjustable blocks 21. The side walls 17 of the drum are provided with apertures 22, which are arranged in a plurality of series spaced longitudinally of the drum. Each series of apertures is aligned with a plane normal to the axis of shaft 19, and the apertures of each series are spaced equal distances about the circumference of the drum. With respect to size, the apertures are of a sufficient diameter so that they may serve as cups or recesses for receiving nuts, substantially as illustrated in Fig. 4. To aid seating of nuts upon the apertures, it will be noted that the outer edges of the apertures are beveled, as indicated at 23.

In conjunction with the drum 11, I provide valve means for the purpose of periodically effecting opening and closing of the apertures as the drum rotates. Thus, positioned within the drum are the curved walls 24 and 26 which have their outer surfaces in relatively close proximity to the inner peripheral surface of the drum. These walls are stationary and are shown supported upon stationary shaft 19 by means of hub 27 and spokes 28. In the proportions illustrated, the segmental extent of wall 24 is somewhat greater than 180°, while the segmental extent of wall 26 is over a relatively small angle of say 15–30°. As each aperture 22 makes a complete revolution the valve cycle is as follows:—Starting with the right hand upper edge of curved wall 24, as viewed in Fig. 4, the aperture first remains open for a short period, as it travels between the upper right hand edge of wall 24 and the right hand edge of wall 26. As it passes over wall 26 the aperture is closed, until it clears the left hand edge of this wall. Thereafter the aperture remains open until it passes the left hand edge of wall 24. The aperture then remains closed until it again clears the right hand edge of wall 24. In the drawings these cyclic periods have been indicated by the numerals 1, 2, 3 and 4 respectively.

In order to draw air inwardly through the apertures as they are passing through the period 1, I provide a suction chamber or box 31 arranged at one side of the drum. This chamber is formed of divergent upper and lower walls 32 and 33, which connect the end walls 34. The open side of chamber 31 is formed on such a contour as to enable close positioning adjacent the drum, as shown in Fig. 4, with the end walls 34 adjacent the ends of the drum. Therefore, for the entire period 3, during which the apertures 22 are open, these apertures are in communication with the box 31. When in operation the box 31 is being continuously evacuated, as by means of a suitable blower having its inlet side connected to the box by means of conduit 36. It may be briefly explained at this point that the sucking of air from the interior of the drum into box 31 is necessarily accompanied by an inflow of air from the exterior of the drum through the apertures passing during the period 1, and that such inward flow of air causes the nuts to be drawn into positions overlying the apertures.

As shown more clearly in Fig. 1, the hopper 14 forms a part of shaker feed means for supplying nuts to the drum 11. Thus, the structure which forms the hopper 14 includes an inclined delivery chute 37 having a width substantially equal to the length of the drum 11. The bottom wall 38 of the chute is provided with parallel ridges 39, serving to divide the same into a plurality of troughs, corresponding in number to the series of apertures 22 provided in the drum. The entire feed structure is shown supported by flexible spring strips 40, and is continually vibrated by suitable means such as an eccentric 41. It will be noted from Fig. 4 that chute 37 delivers nuts to the drum while the adjacent apertures are open and are passing through the initial part of period 1 of the valve cycle. Therefore the nuts are immediately acted upon by the inflowing streams of air, to cause them to assume positions overlying the apertures.

The particular form of conveyor 13 illustrated is constructed as follows:—Sprockets 42 are mounted upon the ends of the drum (Fig. 5) and are rotatable therewith. Likewise, the roll 12 is provided with end sprockets 43. These sprockets are engaged by the endless chains 44. Extending between the chains 44 and having their ends secured thereto, are the spaced bars or slats 46. Underlying the upper run of the conveyor are the troughs 47. The number of these troughs provided corresponds to the number of series of apertures 22 upon the drum, and each trough is aligned with its corresponding series of apertures. The lower end of each trough terminates adjacent the periphery of the drum 11, at such a position that when a nut is picked up from the drum the aperture in which the nut has been positioned has just been closed by the wall 26. In other words, each trough is arranged to pick up the nuts after the apertures retaining the nuts have definitely passed into period 2 of the valve cycle. In order to slide the nuts along the troughs 47 in proper spaced relationship, each of the bars or slats 46 is provided with a plurality of depending fingers 48. These fingers serve to urge the nuts from the drum into the troughs 47, and to slide the nuts upwardly along the troughs, without, however, tending to cause undesired rotation of the nuts.

There may be a tendency at times for the nuts delivered upon the drum from the chute 37 to pile up and to be carried away by the conveyor 13 without first being properly spaced and positioned. To avoid this possible difficulty, I provide a brush or wiper 49 which overlies the conveyor at a region adjacent the lower end of the troughs 47. If the nuts tend to pile up upon the drum, this wiper prevents an improper carryover along the troughs 47.

The remainder of the machine has been adequately described in my aforesaid co-pending application Serial Number 704,863. Briefly, as shown in Figs. 2 and 3, the roll 12 is provided with a plurality of annular V-shaped grooves 52, the side walls of which are formed of resilient material, such as soft vulcanized rubber. The roll 16 carries stamping devices 53 which engage the surface of the nuts, as the nuts are carried over in the grooves 52. Adjacent the under side of the roll 12 are the stripping fingers 54 which serve to disengage the nuts from the grooves 52, whereby they are dropped into the receiving hopper 56. Troughs 47 are preferably provided with means 57, as described in said co-pending application, for the purpose of re-arranging the nuts with their sutures in a plane substantially tangential to the roll 12 as they are being delivered into the grooves 52.

Operation of my machine can now be briefly reviewed as follows:—Drum 11 is rotated at a continuous rate, and the nuts to be branded or marked are introduced into the hopper 14. As the nuts progress down the chute 37 they are generally arranged in rows, and are then delivered upon the drum 11. The nuts tend to fall between the slats 46 of the conveyor and, because of the streams of air flowing inwardly through the adjacent openings 22, the nuts assume positions overlying these openings. Thus the nuts are promptly arranged in rows, and with proper spacing, to be received by the troughs 47. Immediately before the nuts are picked up from the lower ends of the troughs, the suction applied to the corresponding apertures is released, by virtue of the curved valve wall 26, thereby enabling removal from the drum without undue force. At the upper ends of the troughs 47 the nuts are delivered to the grooves 52 in roll 12, where they are engaged by the stamping devices 53, to be finally delivered to the hopper 56.

The outstanding characteristic of my machine is that it will operate at a relatively high speed and capacity. This is because of the rapidity with which the nuts are arranged and spaced upon the drum before delivery to the troughs 47, which in turn is made possible by the apertures 22 and the suction applied to the same.

I claim:

1. In a machine for the handling of nuts or the like, a trough through which nuts are adapted to slide, means including spaced elements adapted to slide nuts along said trough in single file, and pneumatic arranging means adapted to deliver nuts to said trough, one after the other.

2. In a machine for the handling of nuts or the like, a drum having a row of spaced apertures extending about its periphery, the apertures communicating with the interior of the drum, means for delivering nuts to the outer surface of the drum, conveying means for removing nuts from the drum, said conveying means including an endless conveyor extending about the drum, and means for drawing air inwardly through said apertures whereby the nuts are caused to be positioned over said apertures before being removed by said conveying means.

3. In a machine for the handling of nuts or the like, a hollow rotatable drum having cylindrical-shaped side walls, said side walls having spaced apertures extending about its periphery, valve means cooperating with the drum for opening and closing the apertures as the drum rotates, the valve cycle of each aperture in one revolution of the drum consisting consecutively of an open period followed by a closed period, means for applying suction to the interior of the drum whereby air is drawn into the drum from the exterior thereof through apertures passing through the open period, means for delivering nuts to the exterior of the drum in a region wherein the apertures are passing through the open period, and conveying means for removing the nuts from the drum following movement of the apertures past said open period, said last means including an endless conveyor having one end of the same looped about the drum.

4. In a machine for the handling of nuts or the like, a hollow rotatable drum having cylindrical shaped side walls, said side walls having spaced apertures extending about its periphery, each of said apertures being of sufficient diameter to serve as a recess for retaining a nut, valve means cooperating with the drum for opening and closing the apertures as the drum rotates, the valve cycle for each aperture in one revolution of the drum consisting consecutively of an open period, a closed period, a second open period and a second closed period, a suction chamber adjacent one side of the drum and adapted to draw air through said apertures during the second open period whereby air is sucked through the apertures from the exterior of the drum for the first open period, means for delivering nuts to the drum in a region wherein the apertures are passing the first open period, thereby causing the nuts to be drawn into engagement with said apertures, and conveying means for removing the nuts from the drum immediately following movement of the apertures past the first open period.

5. In a machine for the handling of nuts or the like, a hollow rotatable drum having cylindrical shaped side walls, said side walls having spaced apertures extending about its periphery, the apertures being of sufficient diameter to serve as a recess for engaging a nut, valve means for cooperating with the drum for opening and closing the apertures as the drum rotates, the valve cycle for each aperture in one revolution of the drum consisting consecutively of an open period, a closed period, a second open period and a second closed period, a suction chamber disposed adjacent one side of the drum and adapted to draw air through said apertures during the second open period, whereby air is sucked through the apertures from the exterior of the drum for the first open period, means for delivering nuts to the drum in a region wherein the apertures are passing through the first open period, thereby causing the nuts to be drawn pneumatically into positions overlying the apertures, and means including a trough and spaced conveying elements for removing the nuts from the drum immediately following movement of the apertures past the first open period.

HAROLD W. BARTLETT.